May 18, 1965 E. H. IRASEK 3,184,724

RANDOM-ACCESS INFORMATION STORAGE DEVICE UTILIZING FLEXIBLE RECTANGULAR MAGNETIC STRIPS

Filed July 14, 1961 3 Sheets-Sheet 1

INVENTOR.
Eugene H. Irasek
By Louis A. Kline
John J. Matlago
Maurice L. Lang
His Attorneys May 18, 1965 E. H. IRASEK 3,184,724

RANDOM-ACCESS INFORMATION STORAGE DEVICE UTILIZING FLEXIBLE RECTANGULAR MAGNETIC STRIPS

Filed July 14, 1961 3 Sheets-Sheet 2

INVENTOR.
Eugene H. Irasek
By Louis A. Kline
John J. Matlago
Mervyn L. Young
His Attorneys Fig. 4
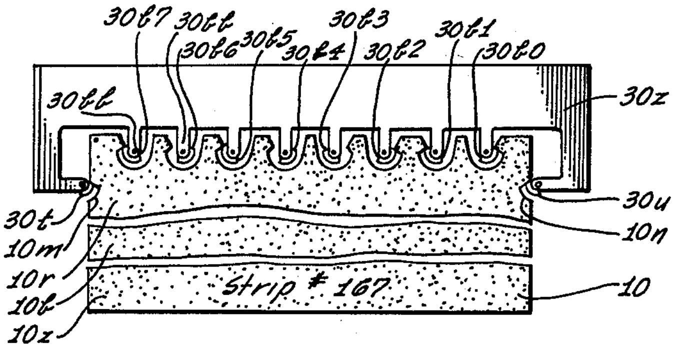
Fig. 5
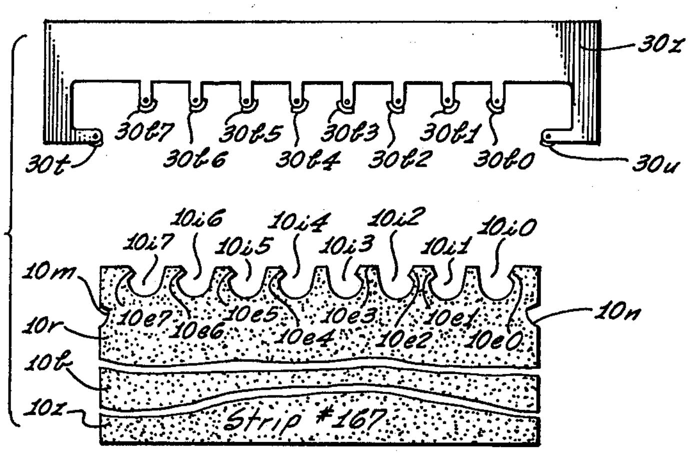
Fig. 6
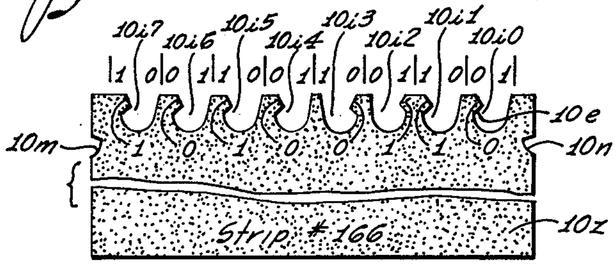
Fig. 4a
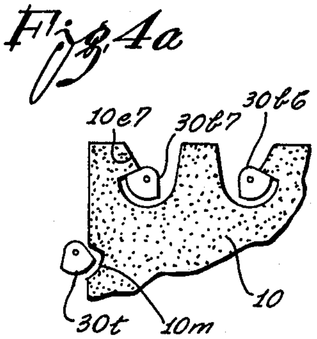
Fig. 7
| | | | | | | | | Strip No. |
|---|---|---|---|---|---|---|---|---|
| 0 | 0 | 0 | 0 | 0 | 0 | 0 | 1 | 1 |
| 0 | 0 | 0 | 0 | 0 | 0 | 1 | 0 | 2 |
| 0 | 0 | 0 | 0 | 0 | 0 | 1 | 1 | 3 |
| 0 | 0 | 0 | 0 | 0 | 1 | 0 | 0 | 4 |
| 1 | 0 | 1 | 0 | 0 | 1 | 1 | 0 | 166 |
| 1 | 1 | 1 | 1 | 1 | 1 | 0 | 1 | 253 |
| 1 | 1 | 1 | 1 | 1 | 1 | 1 | 0 | 254 |
| 1 | 1 | 1 | 1 | 1 | 1 | 1 | 1 | 255 |
INVENTOR.
Eugene H. Irasek
BY Louis A. Kline
John J. Matlago
Mervyn L. Young
His Attorneys United States Patent Office 3,184,724
Patented May 18, 1965

3,184,724
RANDOM-ACCESS INFORMATION STORAGE DEVICE UTILIZING FLEXIBLE RECTANGULAR MAGNETIC STRIPS
Eugene H. Irasek, Los Angeles, Calif., assignor to The National Cash Register Company, Dayton, Ohio, a corporation of Maryland
Filed July 14, 1961, Ser. No. 124,169
2 Claims. (Cl. 340—174.1)

This invention pertains to an information store device and more particularly to magnetic strips or tapes adapted to store information in the form of a large number of binary bits in such a manner as to permit easy and quick access to any bit or group of bits of stored information.

This application is a continuation-in-part of my copending application for U.S. Letters Patent Serial No. 12,032, which was filed on March 1, 1960.

Magnetic tapes for conventional data storage systems possess certain advantages in that reels of such tapes can be removed from the storage system and new reels substituted therefor and the information stored on a particular reel can be saved for later use. However, an inherent disadvantage of the conventional continuous tapes stored on reels is that the information must be stored in a sequential fashion and this information can be accessed only in a sequential fashion. Thus, should a particular information be required which is stored at one end of the magnetic tape, it is often necessary to scan the entire tape before this information can be located.

It is a major object of this invention to provide an improved magnetic storage device.

It is still another object of this invention to provide an improved magnetic storage device, a plurality of which devices may be used to store information that can be retrieved in either a sequential or a random manner.

It is still another object of this invention to provide an improved magnetic storage device for a random access memory system, which device is durable and not subject to wear when employed in a high-speed electro-mechanical storage system.

In my above mentioned application, of which this application is a continuation-in-part, there is disclosed a random access information store system which is adapted to handle the magnetic store device of the present invention. According to the inventions of the above described application and of the present application, the information is recorded by magnetic techniques on strips of strong flexible material. The strips are each provided with suspension or retainer means at one end for suspension in a magazine and are selectively released one at a time to fall into operating means. The operating means transports the strip through a transducing region past "reading" and recording or "writing" transducer means, and imparts momentum to the strip sufficient to return the strip to the magazine. The operating means is arranged for selective operation according to either of two modes. In the first mode a fallen strip is operated upon in a single passage through the transducing region and immediately thereafter is returned to the magazine via a return path; and in the second mode a fallen strip is recirculated through the transducing region one or more times before being returned to the magazine. During any passage through the transducing region the strip may be "read" by a transducer means, or the strip may have one or more binary bits recorded or "written" thereon at respective specific locations; or both such operations may occur. The retainer means at the upper ends of the strips are so devised as to cooperate with a plurality of specially formed selector and suspender means in such fashion that when a particular combination of selector and suspender means is operated, a single strip corresponding to only that combination is released to fall by gravity into the operating means. Magazine loading means are provided for replacing a returned strip onto the selector and suspendor means; and means are provided for insuring that the suspended strips in the magazine are maintained in spaced-apart relationship whereby any selected one of the strips may readily be released and allowed to drop from the magazine irrespective of its position relative to the remainder of the strips. Since by utilizing known magnetic-recording techniques and materials a large number of binary bits of data or information can be stored (recorded) in each square inch of magnetic surface, a large amount of data or information may be stored on a single strip of, for example, three and one-fourth inches width and fourteen inches length. Such a strip, formed of thin durable film-like material with a magnetic coating, may, for example, contain six information channels each divided into twelve hundred and forty "slabs" each of which slabs is divided into thirty-one blocks. In such an arrangement, over two hundred thousand bits of information may be stored on each strip; and if, for example, two hundred and fifty-five strips are contained in the magazine, in excess of fifty-eight million bits may be stored therein. And, since according to the invention any desired one of the strips may be selectively released, dropped, operated upon, and returned to the magazine within a small fraction of one second, it is evident that the invention provides a "random-access" information-store offering quite large storage capacity with access-time greatly reduced from that required, for example, with apparatus utilizing long lenths of magnetic tape as the storage medium. And since a set of the strips may be easily and quickly replaced by any one of other sets of strips stored in convenient containers, the apparatus provides for great flexibility and extended access to almost any possible amount of stored information.

In view of the foregoing general description, a major feature of the present invention resides in flexible rectangular strips of uniform discrete lengths, each strip having a layer of magnetic material uniformly disposed over one of its surfaces and a layer of durable material covering this magnetic layer to give protection against wear. More importantly, one end of the flexible sheet is provided with a series of selectively undercut indentations which are so adapted that a plurality of such sheets may be secured in a system such as described above and any one of the plurality of such sheets may be selectively released as required.

Other objects, advantages, and features of the invention will hereinafter be made apparent upon consideration of the foregoing specification and appended claims when taken in conjunction with the accompanying drawings wherein:

FIG. 4 is an elevational view depicting a strip suspending and strip selecting bar and rod means with a typical information storage strip of the present invention retained by the bar and rod means;

FIG. 4*a* is an enlarged fragmentary view depicting details of the strip selecting and strip suspending means in operative relationship with an information store device of the present invention;

FIG. 5 is a view indicating the relative dispositions of a typical strip and the strip suspending and releasing means, shortly following selection and release of the strip;

FIG. 6 is a view of a typical information storage strip of the present invention illustrating the means used for coding the individual strips; and FIG. 7 is a binary truth table, with portions removed, indicating the coding configuration for a plurality of information store devices or strips of the present invention.

In describing the preferred form of the invention and in the claims certain words and terms will be used which terms and words will have special meanings that may or may not be exactly the same as those defined in a standard dictionary; and the intended meanings of these terms will herein be stated or defined. For example, by the term "random-access" is meant selective next-in-time accessibility of any desired unit of, for example, an information-store comprising many discrete separate data-storage units irrespective of the location of the desired unit within the store. The terms "data" and "information" are herein considered to be synonymous. In the presently described apparatus each strip comprises a unit of information-storage and each unit may store information in several channels each having many sub-units (slabs) and each of the latter comprises many other smaller sub-units; and the actual presentation of a desired information bit or information address at the transducer region is effected in a plurality of stages of which the first comprises selection and release of the particular strip containing that bit or address. The term "address" is herein used in the usual computer-terminology sense.

Figure 1:
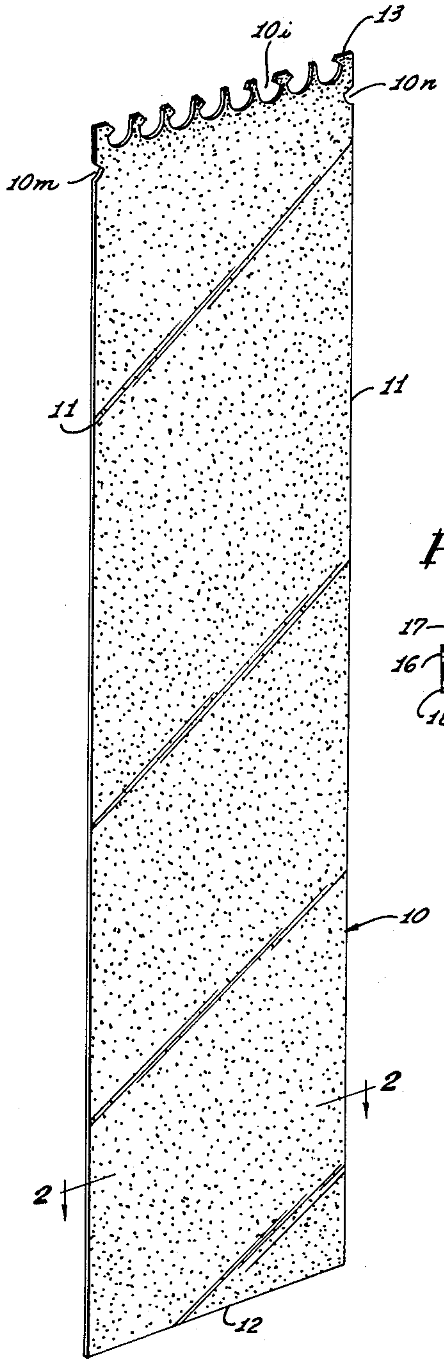
FIG. 1 is a perspective view of the magnetic storage device embodying the present invention.

Referring to FIG. 1 there is shown an embodiment of the information store device or unit of the present invention, 10, in the form of an elongated flexible rectangular sheet having parallel side edges 11, bottom edge 12, and top edge 13 in which are placed a plurality of specifically formed indentations or notches generally denoted 10*i* for purposes which will be described later in more detail. Strip 10 is also provided with a pair of opposed indentations or notches 10*m*, 10*n*, disposed on a respective upper side edges 11.

Figure 2:
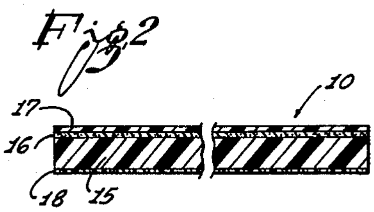
FIG. 2 is a cross-sectional view of the device indicated in FIG. 1.

As shown in FIG. 2, the structure of strip 10 includes a base sheet 15, the front surface on which there is a thin layer of magnetic material 16. Over layer 16 there is placed a layer of protective material 17. The back surface of base material 15 is covered with the uniform coating of conducting material 18, the purpose of which will be later described in more detail.

Figure 3:
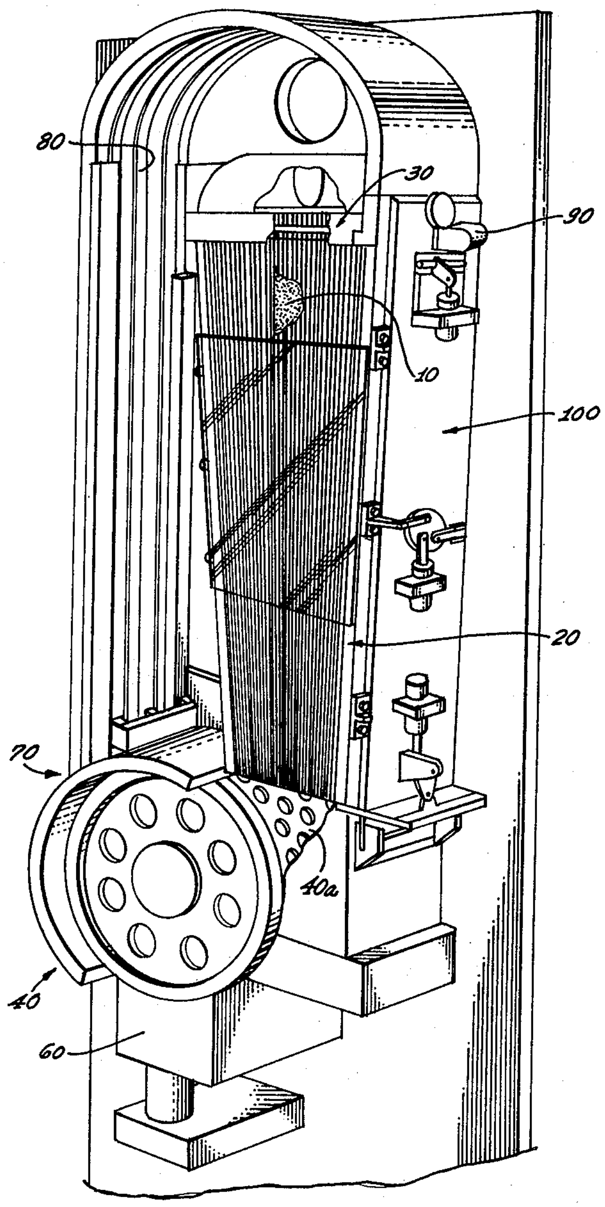
FIG. 3 is a perspective view of storage apparatus adapted to utilize device of the present invention.

For a better understanding of the invention of the present application, a system employing the magnetic device of the invention will now be described. Referring to FIG. 3, a plurality of information-storing strips 10 (hereinafter termed strips) are releasably suspended in a magazine represented generally by the ordinal 20, by strip suspension, selecting and releasing means indicated generally by ordinal 30. The magazine 20, means 30 and other components of the apparatus are supported upon frame means hereinafter described. Means 30 comprise a plurality of rod-like elements, and are constructed and arranged to support a large number of strips 10 and to be operable to select and release any desired one of the strips irrespective of its position in the magazine. The strips are assigned respective binary code numbers and each strip comprises means uniquely representing its number and which cooperate with the rod-like elements, and the rod-like elements are operated in correspondingly coded configurations to release desired strips at the proper times. These means and the mode of operation thereof for selecting and dropping any specified strip will hereinafter be explained in detail. A released strip drops gravitationally into an operating means indicated generally at 40, and into a position in which its lower end portion engages the periphery of a perforated drum or capstan 40*a* comprised in operating means 40. Appropriate portions or arcs of the path of the peripheral inner surface of the capstan 40*a* are, during appropriate intervals of time, pneumatically connected to suction means for provision of a pressure differential between the exterior and interior of the capstan whereby the strip is forcibly held in contact with and is moved by the capstan. During operation of the apparatus the capstan is continuously rotated at a suitable speed by driving means such as an electric motor, whereby the engaged strip is very rapidly driven or transported through the transducing region in which the magnetic transducer means indicated generally at 60, are situated. Application of the pressure differential or suction during appropriate intervals and over only certain limited arcs of the peripheral path of the capstan permits the strip to follow a course or path only parts of which are coincident with the surface of the capstan, whereby good contact with transducing means may be secured, and whereby the strip is permitted to be guided away from the capstan for return to the magazine. Electrically controlled and operated switch or gate means indicated generally at 70 are provided to permit, alternatively, the aforementioned immediate return of the strip to the magazine, or one or more additional passes of the strip past the transducer means. The gate, when open, allows the lower or leading end of the strip to enter a raceway formed as part of guide means indicated generally at 80 and extending upwardly and over the magazine. When closed, the gate forces the moving strip to follow a path in which the strip is again drawn by suction into contact with the surface of the capstan and thereby brought around and again passed through the transducing zone. For proper operation of the strip-transport means the diameter of the capstan is such as to provide a circumference of sufficient length to preclude overlap of the leading and trailing ends of a strip when the latter is being repassed through the transducing zone.

As previously indicated, when operations with a strip by the operating means comprising transport means 40 and transducer means 60 have been completed and the switch or gate means 70 are open, the strip is propelled upwardly along the guideway in guide means 80 and the strip proceeds by its momentum along the inner surface of the curved upper portion of the guideway, and downwardly past a photoelectric detector means indicated by ordinal 90, into a loading means indicated generally at 100. The loading means serves to arrest the strip in proper position for loading onto the suspension means, and to thereafter force the returned strip onto the suspension and releasing devices in means 30. The detector means 90, which preferably comprises photoelectric detecting means, senses arrival of the leading end of the returning strip and initiates certain loading-means operations, and later senses passage of the trailing (upper) end of the strip and initiates other operations of the apparatus. It will be understood, that following release of a strip, the strip-selecting-and-releasing means may be temporarily rendered inoperative for releasing another strip, and maintained in this inoperative status until the dropped strip is removed from the lower (opening) end of the apparatus. The strip selecting and releasing means 30 include pneumatic means for intermittently supplying and directing narrow streams or currents of air downwardly upon and between portions of the suspended strips during appropriate time intervals, for the purpose of keeping the strips separated so any selected and released strip will readily descend into the operating means without appreciable interference by the other strips.

With the foregoing description of the principal functions of the system employing a magnetic device of the present invention, a more detailed description of the feature of the magnetic device may now be made.

From the foregoing description of the system, it will be appreciated that the magnetic strip of the present invention must be in both durable and flexible, and to this end base sheet 15 (FIG. 2) is formed a durable but flexible polyester such as "Mylar," a trademarked product of E. I. du Pont de Nemours and Company. Magnetic layer 16 must also be flexible and to this end, layer 16 is formed of particles of magnetic material, such as the gamma form of ferric oxide, embedded in an adhesive binder that in turn secure the particles to base member 15. The particles are preferably dispersed in the adhesive binder which is sprayed on to the base material in the presence of a magnetic field to orient the particles parallel with the length of the strip.

As the strip traverses the memory system, electrostatic charges build up on the strip and in order to disperse these electrostatic charges, the layer of magnetic particles should be sufficiently conductive and preferably should not have electrical resistance of more than one-half to one megohms per square unit. To disperse electrostatic charges built up on the back surface of the strip, layer 18 is composed of the conductive material preferably carbon secured by an adhesive binder and having electrical resistance of no more than four to ten thousand ohms per square unit. An alternative embodiment would be to disperse conductive particles into the back surface of the "Mylar" strip.

Layer 17 is secured to the outer surface of the magnetic layer 16 to protect the magnetic layer while the strip is in contact with the capstan and transducing means and also while the strip is traversing the memory system. To this end, layer 17 must be of sufficient toughness and is preferably formed of a copolymer of vinyl acetate and vinyl chloride. This copolymer has the additional advantage of providing a "lubricating" action in regard to the surfaces to which it comes in contact.

As indicated in FIGS. 4 and 5, the strips 10 are each provided with a pair of opposed indentations or notches 10*m*, 10*n* disposed at respective upper side edges 11. The upper inclined edges provided by these notches cooperate with complementary supporting surfaces of respective ones of a pair of rotatable suspender bars 30*t*, 30*u*. The suspender bars are formed of sector-shaped cross-section as indicated in FIG. 4, and are mounted for rotation about the axes of the sectors, in a frame 30*z* formed as part of means 30. The two suspender bars are constructed and arranged for opposite concurrent rotation outwardly from the strips, and inwardly into supportive engagement with the strips. As indicated in FIGS. 4 and 5, each of the strips comprises a lower end portion 10*z* (hereinafter termed the leading end), a middle or body portion 10*b* and an upper end portion 10*r* in which the supporting notches 10*m*, 10*n*, are located. In the upper marginal edge of each of the strips there is formed a plurality of undercut indentations or notches generally denoted 10*i* and exemplified by notch 10*i*0, and of which indentations there are eight in the exemplary form; and each individual strip has a unique set of retainer lugs or ears generally denoted 10*e* and exemplified by ear 10*e*7 formed integral therewith and disposed at one or the other (left or right) side of a respective one of the upper marginal indentations in dependence upon a code notation to be described. The lower part of the indentations are rounded to minimize stress concentrations in the surrounding material. Furthermore, care must be exercised in cutting the indentations, as well as all the other edges, so that no burrs are present to catch on the system apparatus as the strip traverses the system.

The retainer lugs or ears are adapted for cooperation with respective ones of a set of eight rotatable selector rods, such as 30*b*7 for example, and which bars are similar to the suspender bars in shape, construction and mounting. The selector rods are adapted to be rotated into and out of engagement with retainer ears of the strips for selective release of individual ones of the strips as presently will be explained. Each of the selector rods is individually operable.

The system employed to permit selection of any individual strip by operation of a respective set of selector rods 30*b*, is illustrated in FIGS. 5, 6, and 7. In accord with principles of the binary system of numbers employed in the code designation of strips whereby control of releasing of the strips may be easily effected by a digital information-processor, each of the strips is provided with as many upper-margin notches or indentations as there are binary orders in the code numbers used; and occurrence of a binary "1" in a code number is represented by a retainer ear 10*e* in a particular position in the corresponding indentation 10*i* of the strip bearing that code number. In the illustrative or exemplary apparatus there are two hundred and fifty-five strips in each set or pack (magazine-full), hence, as indicated in FIG. 5, there are eight upper-margin indentations 10*i*0, 10*i*1 . . . 10*i*7, each corresponding to a respective binary order $2^0$, $2^1$, $2^2$ . . . $2^7$. Each marginal indentation has two sides, left and right, and it is evident that either of the sides may be selected to represent the binary value "1" and the other side the value "0." For purposes of securing more uniform retention and suspension of the strips, the binary value "1" is assigned to the right side of each of the alternate indentations, 10*i*0, 10*i*2, 10*i*4, and 10*i*6, and to the left side of each of the other indentations; and the binary value "0" is assigned to the sides opposite those assigned the value "1," all as indicated above for exemplary strip No. 166 in FIG. 6. With the described arrangement, the binary numbers corresponding to respective decimal numbers 1 through 255 may be represented by respective configurations or dispositions of retainer ears 10*e* in the upper marginal indentations. Thus, in FIG. 6, the retainer ear configuration for binary number 10100110, corresponding to decimal number 166, is shown as it occurs on the strip of that designation. Therein the retainer ear 10*e* for indentation 10*i*0, that is, for the lowest order position, is at the left or "0" side of the indentation, that for indentation 10*i*1 corresponding to the next higher binary order is at the left or "1" side of the indentation, etc.; and the corresponding binary digit represented by the ear in each of the indentations is thereunder indicated. Thus it is evident that to select strip No. 166, selector rods 30*b* in each of indentations 10*i*0, 10*i*3, 10*i*4, and 10*i*6 must be in or rotated to "0" attitude or position, and the other selector rods similarly be in or rotated to "1" position. The configuration of retainer ears for any of the set of strips is readily derived from an ordinary "truth table" which lists all the possible combinations of binary digits in representations of any specified number of binary positions. For example, a truth table for the eight binary positions required in the strip-coding in the exemplary apparatus, is depicted in fragmentary form in FIG. 7. Therein the code designations for the first four strips, the last three strips, and the aforedescribed exemplary strip No. 166 are indicated; and from the binary values represented in the table the respective retainer-ear configurations for the strips of the set are derived for use in punching the several strips.

As indicated in FIG. 4, a typical strip 10 is shown suspended by suspender bars 30*t*, 30*u*, and retained by engagement of selector rods 30*b* engaging respective retainer ears. By reference to FIGS. 5 and 6, it is evident that the ear-configuration corresponds to binary number 10100111, or decimal number 167, and hence the strip is identified as strip No. 167. In the exemplary apparatus the selector rods are spring-stressed to the "1" positions, that is, to positions in which they engage retainer ears that are in the "1" sides of indentations. This normal attitude or positional relationship is illustrated in FIG. 4. Thus it is evident that when strip No. 167 is to be selected, selector rods 10*i*0, 10*i*1, 10*i*2, 10*i*5, and 10*i*7 must be rocked or rotated from "1" position to "0" position, and rods 10*i*3, 10i4, and 10*i*6 must be left in "1" position. Thus for the selection of this exemplary card, activating current signals will be supplied to the respective actuators for the selector rods to be moved, and no current signals will be supplied to the other selector rod actuators. Following operation of the required set of selector rods in response to receipt of the respective set of signals from a processor-operated controller, the selected strip will fall slightly so as to rest on the two suspender bars **30*t* and 30*u*** which are then rocked outwardly and the selected strip drops under the influence of gravity, and the selector rods and suspended bars are then permitted to return to respective normal "1," or strip-supporting, positions. It is evident that during the interval in which the suspender bars are rocked outwardly, all strips excepting the selected strip are suspended from the selector rods.

Since the storage units of the present invention are of discrete lengths, it is possible to make the unit of a width greater than that of conventional tapes. This provides the advantage of obtaining a higher storage density per unit of length and, more importantly, allows for the provision of a greater transverse stiffness than obtained with conventional tapes. While the device of the present invention has a thickness greater than that of many conventional tapes due to the protective layer, the overall thickness of the device can be made as small as 0.006 inch as required for use in the system of my copending application.

From the foregoing explanation of the invention in the description of the preferred embodiment thereof it is evident that modifications and changes therein will occur to those skilled in the art; and accordingly it is not desired to limit the invention to the specific details of the described exemplary embodiment but only as indicated by the scope of the following claims.

What is claimed is:

1. In a random access storage system having a predetermined plurality of rotatable selector rods arranged alongside and parallel to one another in a common plane and a pair of rotatable suspender bars located on opposite sides of said rotatable selector rods and spaced from said common plane, a plurality of flexible rectangular magnetic data-storage strips vertically suspended from said selector rods and said suspender bars and cooperating therewith so that only one of said strips can be released for free fall at a time depending upon the selective orientation of said selector rods, each strip having a pair of opposite flat surfaces, a pair of parallel side edges and a pair of end edges, the pair of side edges of each strip having a length many times greater than the end edges, one of the end edges of each strip being provided with a unique binary-coded configuration of undercut edge indentations for cooperation with said selector rods, and the pair of parallel side edges of each strip being provided with a pair of opposed side indentations for cooperation with said suspender bars and located relatively close to but spaced from the end edge containing said undercut edge indentations, each strip being formed of a flexible material having a flexible layer of conductive material uniformly disposed on one flat surface thereof for dispersing electrostatic charges and a layer of magnetic material uniformly disposed on the opposite flat surface thereof, and a protective layer of durable material uniformly disposed over the magnetic layer.

2. In a random access storage system the combination of: a predetermined plurality of rotatable selector rods arranged alongside and parallel to one another in a common plane, a pair of rotatable suspender bars located on opposite sides of said rotatable selector rods and spaced from said common plane, and a plurality of flexible rectangular magnetic data-storage strips vertically suspended from said selector rods and said suspender bars and cooperating therewith so that only one of said strips can be released for free fall at a time depending upon the selective orientation of said selector rods, each strip having a pair of opposite flat surfaces, a pair of parallel side edges and a pair of end edges, the pair of side edges of each strip having a length many times greater than the end edges, one of the end edges of each strip being provided with a unique binary-coded configuration of undercut edge indentations for cooperation with said selector rods, and the pair of parallel side edges of each strip being provided with a pair of opposed side indentations for cooperation with said suspender bars and located relatively close to but spaced from the end edge containing said undercut edge indentations, each strip being formed of a flexible material having a flexible layer of conductive material uniformly disposed on one flat surface thereof for dispersing electrostatic charges and a layer of magnetic material uniformly disposed on the opposite flat surface thereof, and a protective layer of durable material uniformly disposed over the magnetic layer, the construction and arrangement of the selector rods, the suspender bars and the indentations provided in each strip being such that each of the predetermined plurality of strips except for a selected strip will normally be vertically suspended as a result of at least one of its edge indentations intercepting a respective selector rod, the side indentations of each such strip then being adjacent but slightly spaced from said suspender bars, the selected strip being the one corresponding to the particular orientation of the selector rods so that its edge indentations will be free therefrom to permit its side indentations to rest on said suspender rods below the other strips, whereupon the outward movement of said suspender rods away from the side indentations will cause the selected strip to fall free under the influence of gravity, each of the remaining strips being prevented from falling by at least one of its edge indentations intercepting a respective selector rod.

References Cited by the Examiner

UNITED STATES PATENTS

| | | | |
|---|---|---|---|
| 2,602,451 | 7/51 | Hofgaard | 340—174.1 |
| 2,620,389 | 12/52 | Potter | 340—174.1 |
| 2,650,830 | 9/53 | Potter | 340—174.1 |
| 2,674,728 | 4/54 | Potter | 340—174.1 |
| 2,722,676 | 11/55 | Begun | 340—174.1 |
| 2,860,048 | 11/58 | Deubner | 346—74 X |
| 2,902,329 | 9/59 | Brink et al. | 340—174.1 |

IRVING L. SRAGOW, *Primary Examiner.*